US008533165B2

(12) United States Patent
Akinyemi et al.

(10) Patent No.: US 8,533,165 B2
(45) Date of Patent: Sep. 10, 2013

(54) CONFLICT RESOLUTION VIA METADATA EXAMINATION

(75) Inventors: Adedeji Olumuyiwa Akinyemi, Sammamish, WA (US); Okacey Chidinma Abaraoha, Seattle, WA (US); Brian Douglas Remick, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 261 days.

(21) Appl. No.: 13/175,868

(22) Filed: Jul. 3, 2011

(65) Prior Publication Data

US 2013/0006947 A1 Jan. 3, 2013

(51) Int. Cl.
*G06F 17/30* (2006.01)

(52) U.S. Cl.
USPC ........................................... 707/690; 707/695

(58) Field of Classification Search
None
See application file for complete search history.

(56) References Cited

U.S. PATENT DOCUMENTS

| 6,925,476 | B1 * | 8/2005 | Multer et al. ........................ 1/1 |
| 7,529,780 | B1 * | 5/2009 | Braginsky et al. .................... 1/1 |
| 7,584,186 | B2 | 9/2009 | Chen et al. |
| 7,644,109 | B2 * | 1/2010 | Manley et al. ......... 707/999.203 |
| 7,660,809 | B2 | 2/2010 | Cortright et al. |
| 7,822,711 | B1 | 10/2010 | Ranade |
| 8,311,981 | B2 * | 11/2012 | Braginsky et al. ............ 707/618 |
| 8,332,359 | B2 * | 12/2012 | Kreuch et al. ................ 707/638 |
| 2007/0088707 | A1 | 4/2007 | Durgin et al. |
| 2007/0111185 | A1 * | 5/2007 | Krebs .......................... 434/350 |
| 2008/0040388 | A1 * | 2/2008 | Petri et al. ................... 707/104.1 |
| 2009/0216815 | A1 * | 8/2009 | Braginsky et al. ............ 707/203 |
| 2009/0271696 | A1 | 10/2009 | Bailor et al. |
| 2009/0327358 | A1 | 12/2009 | Lukiyanov et al. |
| 2010/0023562 | A1 * | 1/2010 | Kreuch et al. ................ 707/203 |
| 2011/0004702 | A1 | 1/2011 | Tsofi et al. |
| 2012/0059806 | A1 * | 3/2012 | Kumar et al. ................. 707/696 |

OTHER PUBLICATIONS

Cox, et al., "File Synchronization with Vector Time Pairs", Retrieved at <<http://publications.csail.mit.edu/tmp/MIT-CSAIL-TR-2005-014.pdf>>, Feb. 28, 2005, pp. 15.
Yi, Li, "Model Checking Application on File Synchronization Algorithms", Retrieved at <<http://www.comp.nus.edu.sg/~liyi/host/Home_files/UROP_Project_Report_LIYI.pdf>>, 2009/2010, pp. 42.
"Handling Conflicts", Retrieved at <<http://msdn.microsoft.com/en-us/library/bb902840(v=sql.100).aspx>>, Retrieved Date: Mar. 17, 2011, pp. 7.

* cited by examiner

*Primary Examiner* — Sherief Badawi

(57) ABSTRACT

A provided computing device detects a synchronization conflict between two versions of a file and may examine corresponding metadata fields. The computing device may characterize a nature of a difference between metadata fields as immutable, mergeable, or subsumable. Core metadata fields may be defined such that a nature of a difference, or conflict, is categorized as immutable. Non-core metadata fields may be defined such that a nature of a difference, or conflict, is characterized as either mergeable or subsumable. A conflict between corresponding mergeable non-core metadata fields may be resolved by merging values of the corresponding non-core metadata fields. A conflict between corresponding subsumable non-core metadata fields may be resolved by replacing a value of a non-core metadata field of an older of the two versions of the file with a value of a corresponding non-core metadata field of a younger of the two versions of the file.

20 Claims, 4 Drawing Sheets

| FOCAL LENGTH 502 | GEOTAG 504 | EXPOSURE 506 | CAPTION 508 | VIEW CNT 510 |
|---|---|---|---|---|

CORE METADATA FIELDS (502, 504, 506, 508, 510)

FIG. 5

| FOCAL LENGTH 502 | GEOTAG 504 | EXPOSURE 506 | "HAWAII" 508 | "1,298" 510 |
|---|---|---|---|---|

FIG. 6

| FOCAL LENGTH 502 | GEOTAG 504 | EXPOSURE 506 | "WAIKIKI BEACH" 508 | "1,532" 510 |
|---|---|---|---|---|

FIG. 7

| FOCAL LENGTH 502 | GEOTAG 504 | EXPOSURE 506 | "WAIKIKI BEACH, HAWAII" 508 | "1,532" 510 |
|---|---|---|---|---|

FIG. 8

CONFLICT RESOLUTION VIA METADATA EXAMINATION

BACKGROUND

During file synchronization, conflicts commonly occur. Typically, conflicts are a result of updates to a given file from multiple devices. Some existing file synchronization solutions provide an option for manual user resolution of conflicts. However, manual user resolution is cumbersome for users and can negatively affect a user's experience. Current solutions for automatically resolving conflicts can result in a transferring of a significant amount of user data as well as data duplication, both of which consume bandwidth and storage.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a computing device may detect a file synchronization conflict between two versions of a file. The computing device may determine whether the conflict is due to metadata differences between the two versions of the file. Core metadata fields may be metadata fields that are unchangeable. That is, a nature of a difference between core metadata fields of the two versions of the file may be categorized as immutable. In other words, two versions of the file may be expected to have identical core metadata fields. If the conflict is determined to be due to non-core metadata field differences, a nature of each of the non-core metadata field differences, or conflicts, may be characterized as either mergeable or subsumable. Conflicts characterized as mergeable may be resolved by merging values of corresponding conflicted non-core metadata fields to produce a conflict-resolved value for the corresponding conflicted non-core metadata fields. Conflicts characterized as subsumable may be resolved by replacing a value of a non-core metadata field of an older one of the two versions of the file with a corresponding non-core metadata field of a younger one of the two versions of the file. As a result, the corresponding non-core metadata fields of the two versions of the file may have identical values equal to a value of the non-core metadata field of the younger one of the two versions of the file.

In some variations of the embodiments, when either the core metadata fields of the two versions of the file fail to match or when metadata and/or contents of the two versions of the file fail to match after examining and attempting to resolve any differences in the non-core metadata fields, copies of the two versions of the files may be saved. In an alternate embodiment, instead of saving copies of the two versions of the file, a user may be prompted to select one of a number of possible conflict resolution solutions.

DRAWINGS

In order to describe the manner in which the above-recited and other advantages and features can be obtained, a more particular description is described below and will be rendered by reference to specific embodiments thereof which are illustrated in the appended drawings. Understand that these drawings depict only typical embodiments and are not therefore to be considered to be limiting of its scope. Implementations will be described and explained with additional specificity and detail through the use of the accompanying drawings.

FIG. 5 illustrates an exemplary layout of metadata fields of a file.

FIGS. 6 and 7 illustrate exemplary non-core metadata values of respective versions of a file.

FIG. 8 illustrates values of non-core metadata fields of two versions of a file after performing the exemplary process described by the flowchart of FIGS. 3 and 4.

DETAILED DESCRIPTION

Overview

File synchronization conflicts can occur due to file updates received from multiple sources. Many file synchronization conflicts can occur due to conflicting changes in file metadata. However, current conflict resolution solutions do not resolve metadata conflicts in a way that is tailored for metadata conflicts. For example, solutions involving manual user resolution of conflicts are awkward and tend to negatively affect a user's experience. Automatic conflict resolution solutions treat the file as a whole, as opposed to inspecting metadata separately from the file contents and may lead to a transferring of a significant amount of user data as a result of data duplication, thereby consuming more storage and bandwidth.

Embodiments consistent with the subject matter of this disclosure classify file synchronization conflicts into either conflicts due to metadata differences or conflicts due to differences in file content. For conflicts that are due solely to metadata differences, a nature of the metadata differences is categorized. A conflict resolution solution is provided which intelligently combines files without duplication of file contents or user intervention.

In various embodiments, upon detecting a conflict between two versions of a file, a determination may be made regarding whether the conflict is due to metadata differences. If the conflict is determined to be due to metadata differences, a nature of each of the metadata differences may be categorized as immutable, mergeable, or subsumable. If the conflict is categorized as immutable, the metadata differences may be ignored and all conflicted versions of the file may be saved. In an alternate embodiment, if the conflict is categorized as immutable, a different action may be taken including, but not limited to, prompting a user regarding a selection of one of a number of conflict resolution actions. If the conflict is categorized as mergeable, contents or values of corresponding metadata fields may be merged. If the conflict is categorized as subsumable, a content or a value of a metadata field from an older version of a file may be replaced with a content or a value of a metadata field of a newer version of the metadata field.

Exemplary Operating Environment

Figure 1:
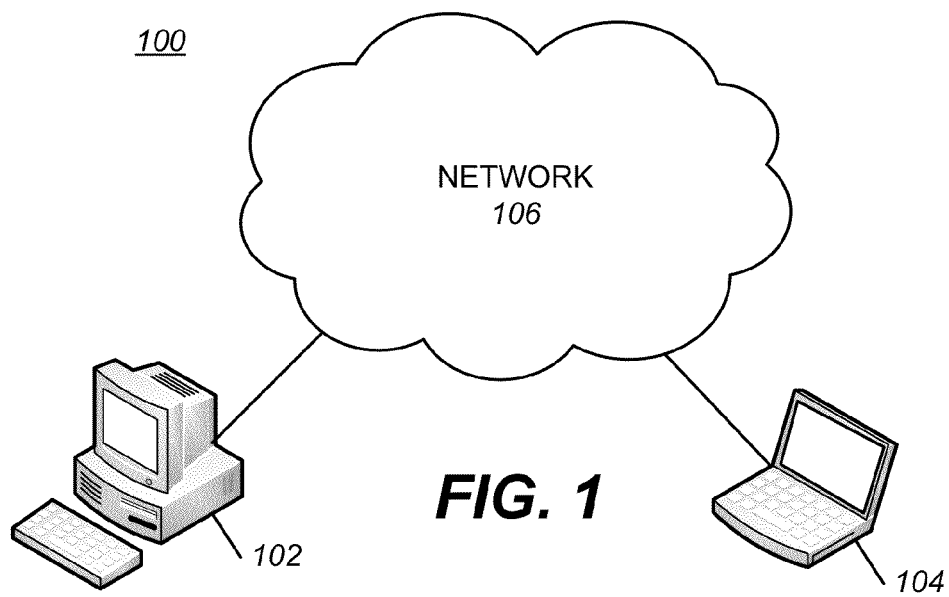
FIG. 1 illustrates an exemplary environment in which embodiments consistent with the subject matter of this disclosure may operate.

FIG. 1 illustrates an exemplary operating environment 100 in which various embodiments consistent with the subject matter of this disclosure may be implemented. Operating environment 100 may include a first computing device 102, a second computing device 104 and a network 106. First computing device 102 and/or second computing device 104 may be a personal computer (PC), a handheld device, a laptop computer, a server, or any other type of computing device. Network 106 may include one or more networks of various types, including, but not limited to, a private corporate network, a public network, a packet switching network, the Internet, a fiber optic network, a wireless network, or other types of networks. In one embodiment, network 106 may be a direct connection between first computing device 102 and second computing device 104, such as, for example, an infrared network connection, a Bluetooth® (Bluetooth is a registered trademark of BLUETOOTH SIG, INC. of Kirkland, Wash.) network connection, a WiFi (Wireless Fidelity) network connection, or other type of direct connection between first computing device 102 and second computing device 104.

Exemplary Processing Devices

Figure 2:
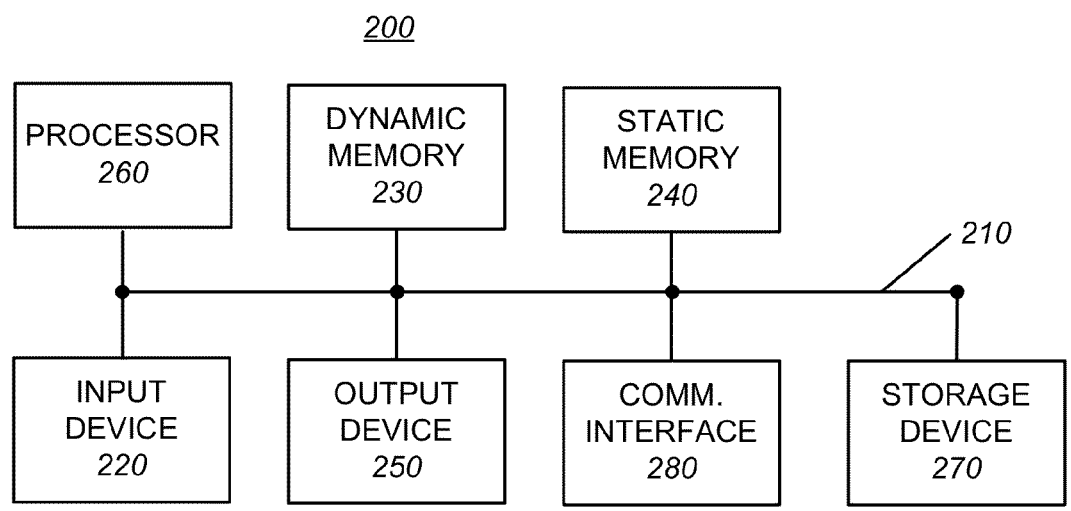
FIG. 2 is a functional block diagram of an exemplary computing device which may implement embodiments consistent with the subject matter of this disclosure.

FIG. 2 is a block diagram of an exemplary computing device 200, which may be used to implement embodiments of first computing device 102 and/or second computing device 104. Computing device 200 may be a server, a personal computer (PC), a handheld computing device or another type of computing device. Computing device 200 may include hardware, such as a processor 260, a bus 210, a storage device 270, an input device 220, an output device 250, a communication interface 280 and a memory, which may include a combination of a dynamic memory 230 and a static memory 240.

Dynamic memory 230 may include, but not be limited to, a random access memory (RAM) or other dynamic machine-readable storage medium. Static memory 240 may include, but not be limited to, a read only memory (ROM) or other static machine-readable storage medium. Dynamic memory 230, or another type of dynamic machine-readable storage medium, may store instructions as well as temporary variables or other intermediate information used during execution of instructions by processor 220. Static memory 240, or another type of static machine-readable storage medium, may store static information and instructions for execution by processor 260.

Processor 260 may include one or more conventional processors that interpret and execute instructions. Some embodiments of computing device 200 may further include a hardware logic component, including, but not limited to, an application specific integrated circuit (ASIC) (not shown) and/or a field programmable gate array (FPGA) (not shown) that may be combined with instructions in memory 230, 240 to cause computing device 200 to perform a method.

Input device 220 may include a keyboard, a pointing device, or other device for providing input. Output device 250 may include a display, a printer, or other device for outputting information. Communication interface 280 may include a transceiver for sending and receiving information via network 106.

Storage device 270 may include a machine-readable storage medium such as, for example, a magnetic disk, a writable optical disc, a flash RAM device, or other type of machine-readable storage medium for storing data, instructions, or other information. Other non-limiting examples of storage device 250 may also include Digital Video Disk (DVD), compact Disk (CD), or other types of storage devices that use other types of machine-readable storage media for storing data and/or instructions for later use.

Computing device 200 may communicate with other devices via a communication medium, which may include, but not be limited to a propagated signal on a carrier wave.

Computing device 200 may perform functions in response to processor 260 executing sequences of instructions contained in a machine-readable storage medium. In some embodiments, the sequences of instructions may be read into the machine-readable storage medium from another machine-readable storage medium or from a separate device via communication interface 280 and the communication medium.

Embodiments

Figure 3:
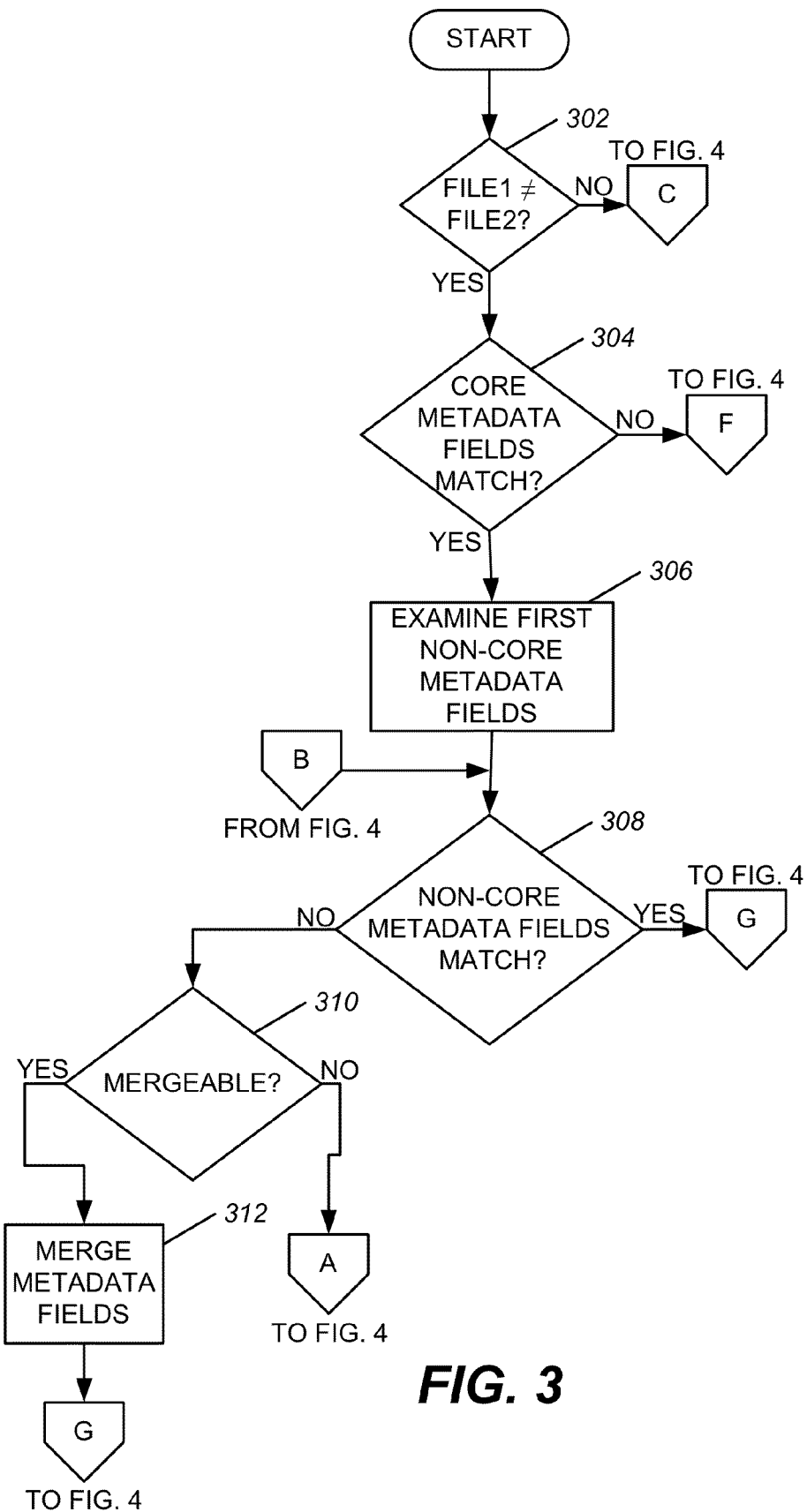
FIGS. 3 and 4 are flowcharts illustrating an exemplary process which may be performed in various embodiments.
Figure 4:
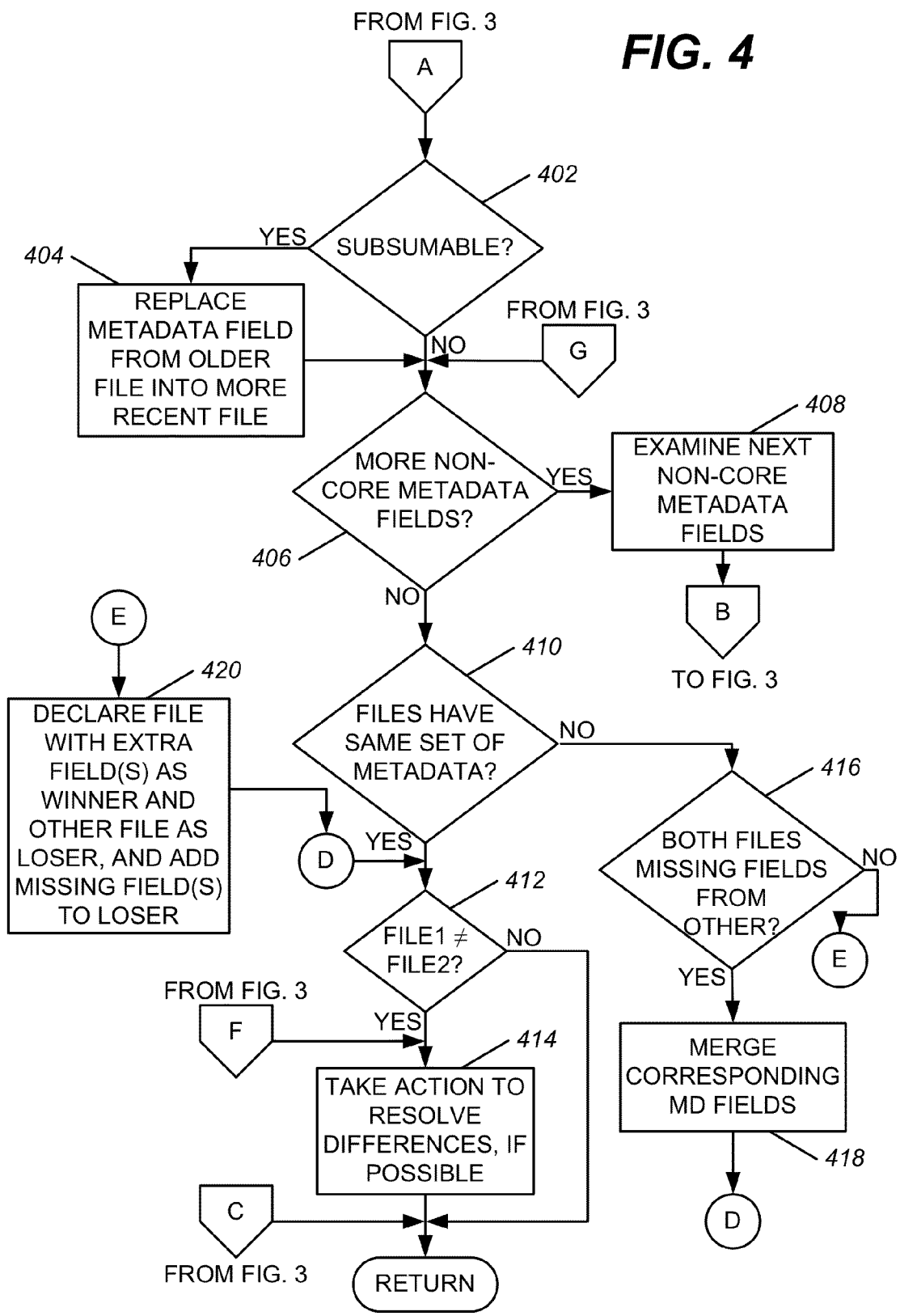

FIGS. 3 and 4 are flowcharts illustrating an exemplary process, which may be performed in various embodiments, for resolving conflicts via metadata examination. The process may begin with a computing device determining whether a first file is different from a second file (act 302). The first file may be stored in a storage medium associated with the computing device. The second file may be stored in a storage medium associated with a second computing device. In some embodiments, act 302 may be performed by comparing a first file hash, calculated over contents and metadata of the first file, with a second file hash, calculated over contents and metadata of the second file. The first file hash and the second file hash may be previously calculated in some embodiments. If the first file hash and the second file hash are determined to be equal, then the contents and the metadata of the first file are identical to the contents and the metadata of the second file and the process is completed.

If, during act 302, the computing device determines that the first file and the second file are different, then the computing device may determine whether core metadata fields of the first file match corresponding core metadata fields of the second file (act 304). In various embodiments, core metadata fields may be categorized as immutable. That is, the core metadata fields may not be changed. As a result, two different versions of a file are expected to have matching corresponding core metadata fields.

If, during act 304, the core metadata fields of the first file are determined to match the core metadata fields of the second file, then the computing device may prepare to examine respective first non-core metadata fields of the first file and the second file (act 306). The computing device may then determine whether a non-core metadata field (the first non-core metadata field) of the first file matches a corresponding non-core metadata field (the first non-core metadata field) of the second file (act 308).

If, during act 308, the computing device determines that the respective non-core metadata fields do not match, then the computing device may determine whether a nature of a difference, or conflict, between the respective non-core metadata fields is categorized as mergeable (act 310). In some embodiments, various non-core metadata fields may be configured or defined as mergeable, such that a difference, or conflict, between corresponding ones of the various non-core metadata fields of two versions of a file may be categorized as mergeable. If the computing device determines that the difference, or the conflict, between the respective non-core metadata fields is categorized as mergeable, then the computing device may merge contents or values of the respective corresponding non-core metadata fields to produce a conflict-resolved value and may set the respective non-core metadata fields to the conflict-resolved value (act 312).

If, during act 310, the computing device determines that the difference, or the conflict, between the respective non-core metadata fields is not categorized as mergeable, then the computing device may determine whether the difference, or the conflict, between the respective non-core metadata fields is categorized as subsumable (act 402; FIG. 4). In some embodiments, various non-core metadata fields may be configured or defined as subsumable, such that a nature of a difference, or a conflict, between corresponding ones of the various non-core metadata fields of two versions of a file may be categorized as subsumable. If the computing device determines that the nature of the difference, or the conflict, between the respective non-core metadata fields is categorized as subsumable, then the computing device may replace a value of the non-core metadata field of an older one of the first file and the second file with the corresponding non-core metadata field of a more recent one of the first file and the second (act 404).

Next, if during act 308 the computing device determines that the respective non-core metadata fields match, or after the computing device completes acts 312 or 404, or after the computing device determines, during act 402, that the nature of the difference or the conflict is not subsumable, then the computing device may determine whether the first file and the second file have more non-core metadata fields to compare (act 406). If, during act 406, the computing device determines that the first file and the second file have more non-core metadata fields to compare, then the computing device may prepare to examine a next non-core metadata field of the first file and a next corresponding non-core metadata field of the second file (act 408). The computing device may then determine whether the respective next non-core metadata fields match (act 308; FIG. 3).

If, during act 406, the computing device determines that there are no additional non-core metadata fields to examine, then the computing device may determine whether the first file and the second file now have a same set of metadata (act 410). If the computing device determines that the first file and the second file now have the same set of metadata, then the computing device may determine whether the first file and the second file remain different from each other (act 412). In some embodiments, the computing device may perform act 412 by recalculating the first hash over the metadata and the contents of the first file, recalculating the second hash over the metadata and the contents of the second file, and determining whether the first hash and the second hash are equal or different from each other.

If, during act 412, the computing device determines that the first file and the second file are equal (do not remain different), then the process is complete. Otherwise, the computing device may take action to attempt to resolve differences between the first file and the second file (act 414), before completing the process. In some embodiments, act 414 may include the computing device renaming an older file of the first file and the second file and duplicating and saving the renamed older file and a more recent file of the first file and the second file. In other embodiments, act 414 may include the computing device presenting a prompt to a user asking the user to select one of a number of actions to perform to attempt to resolve the differences. For example, the computing device may present values of conflicting fields and may prompt the user to select one of the presented values as a winner. The computing device may use the value of the selected winner to set the respective corresponding field of one of the file and the second file not having the selected winner value. The above listed actions are just a few examples of many possible alternative actions that may be performed during act 414. In other embodiments, the computing device may perform other actions during act 414 to resolve differences.

If, during act 410, the computing device determines that the first file and the second file do not have the same set of metadata, then the computing device may determine whether the first file is missing a value of one or more metadata fields that have a value in the second file, and whether the second file is missing a value of one or more metadata fields that have a value in the first file (act 416). If the computing device determines that the first file is missing a value of one or more metadata fields that have a value in the second file, and the second file is missing a value of one or more metadata fields that have a value in the first file, then the respective corresponding metadata fields of the first file and the second file may be merged to produce a conflict-resolved value, which may be set in the respective corresponding metadata fields of the first file and the second file (act 418). The computing device may then perform act 412, again, to determine whether the first file and the second file remain different from each other.

If, during act 416, the computing device fails to determine that the first file is missing one or more values of one or more metadata fields that have respective values in the one or more corresponding metadata fields of the second file, and that the second file is missing one or more metadata fields that have a value in the corresponding one or more metadata fields of the first file, then the computing device may declare one of the first file and the second file having one or more extra values for one or more corresponding metadata fields as a winner, and may declare another of the first file and the second file as a loser. The computing device add the one or more values of the one or more corresponding meta-data fields of the winner to the one or more of corresponding metadata fields, having a missing value, of the loser (act 420).

If, during act 302, the computing device determines that the content and the metadata of the first file is not different from the content and the metadata of the second file, then the process is completed.

If, during act 304, the computing device determines that the core metadata fields of the first file and the second file do not match, then the computing device may perform act 414 and the process is completed.

FIG. 5 illustrates an exemplary metadata field layout of a digital photo file. The metadata fields may include a focal length 502, a geotag 504, an exposure 506, a caption 508, and a view count 510. Focal length 502 may have a value equal to a focal length of a digital photo. Geotag 504 may have a value indicative of a location at which the digital photo was captured. Exposure 506 may have a value equal to an exposure setting up a digital image capturing device that captured an image for the digital photo. Caption 508 may include textual characters that describe the digital photo. View count 510 may have a value indicating a number of times the digital photo has been viewed. Focal length 502, geotag 504 and exposure 506 may be defined, or configured, to be immutable or unchangeable. That is, focal length 502, geotag 504 and exposure 506 may be core metadata fields.

FIG. 6 illustrates exemplary metadata fields of a first digital photo file having the metadata field layout illustrated by FIG. 5. As mentioned above, focal length 502, geotag 504 and exposure 506 may be core metadata fields. Caption metadata field 508 may have a value of "Hawaii" and view count metadata field 510 may have a value of "1,298".

FIG. 7 illustrates exemplary metadata fields of a second digital photo file, which, in this example, is another version of the first digital photo file from another device. As previously mentioned, focal length 502, geotag 504 and exposure 506 may be core metadata fields. Caption metadata field 508 of the second digital photo file may have a value of "Waikiki Beach" and view count metadata field 510 of the second digital photo file may have a value of "1,532".

FIG. 8 illustrates values of exemplary metadata fields of the first digital photo file and the second digital photo file after performing the exemplary method according to the flowcharts of FIGS. 3 and 4. In this example, we assume that contents of the first digital photo file is equal to contents of the second digital photo file while metadata of the first digital photo file is not equal to metadata of the second digital photo file.

With respect to FIG. 3 and the above example, a computing device may determine whether metadata and contents the first digital photo file and the second digital photo file are different (act 302). In this example, because the metadata of the two digital photo files are different, the computing device determines that the two digital photo files are different. Therefore, the computing device may determine whether core metadata fields of the first digital photo file and corresponding core metadata fields of the second digital photo file match (act 304). In this example, we assume that the core metadata fields match.

The computing device then may prepare to examine respective first non-core metadata fields of the first digital photo file and the second digital photo file (act 306). In this example, the respective non-core metadata fields correspond to caption metadata field 508 and have values "Hawaii" and "Waikiki Beach", respectively. The computing device may then determine whether the respective non-core metadata fields match (act 308). Because the respective non-core metadata fields do not match, the computing device may determine whether a nature of the difference between the respective non-core metadata fields is categorized as mergeable (act 310). In this example, the respective non-core metadata fields are categorized as mergeable.

Next, because the nature of the difference the respective non-core metadata fields is categorized as mergeable, the computing device may merge "Hawaii" and "Waikiki Beach" to produce a conflict-resolved value of "Waikiki Beach, Hi.", which the computing device may set as a value for corresponding metadata fields of the first digital photo file and the second digital photo file (act 312). The computing device may then determine whether the first digital photo file and the second digital photo file have more non-core metadata fields (act 406; FIG. 4). In this example, the first digital photo file and the second digital photo file have more non-core metadata fields. The computing device may then prepare to examine next respective non-core metadata fields of the first digital photo file and the second digital photo file (act 408).

Returning to FIG. 3, the computing device may then determine whether the next respective non-core metadata fields match (act 308). In this example, the next respective non-core metadata fields correspond to the view count metadata field of the first digital photo file and the second digital photo file having values "1,298" and "1,532", respectively, which do not match. The computing device may then determine whether a nature of the difference between the respective next non-core metadata fields is categorized as mergeable (act 312).

In this example, the nature of the difference between the respective next non-core metadata fields is categorized as subsumable. Therefore, the computing device then may determine whether the nature of the difference between the respective next non-core metadata fields is categorized as subsumable (act 402; FIG. 4). Because, in this example, the nature of the difference between the respective next non-core metadata fields is characterized as subsumable, the computing device may then replace a value of the next non-core metadata field of an older file of the first digital photo file and the second digital photo file with a value of the next non-core metadata field of a more recent file of the first digital photo file and the second digital photo file (act 404). In this example, "1,298" is replaced by 1,532 producing a conflict-resolved value of "1,532", which the computing device sets as a value of non-core metadata field view count of the older of the first digital photo file and the second digital photo file.

Next, the computing device may determine whether there are more non-core metadata fields to examine (act 406). In this example, there are no more non-core metadata fields to examine. Therefore, the computing device may then determine whether the metadata fields of the first digital photo file and the metadata fields of the second digital photo file are equal (act 410). In this example, the metadata fields are equal.

Next, the computing device may determine whether the first digital photo file is different from the second digital photo file (act 412). Because, in this example, we assume that the first digital photo file and the second digital photo file have respective contents that are equal, the process is now completed.

FIG. 8 illustrates values of the caption metadata field and the view count metadata field of the first digital photo file and the second digital photo file after the above-mentioned process is completed. The core metadata fields remained unchanged, the caption metadata field has a value of "Waikiki Beach, Hi.", and the view count metadata field has a value of "1,532".

Although the above example discussed digital photo files, a computing device in various embodiments may resolve file synchronization conflicts with respect to metadata of other types of files including, but not limited, audio files, video files, and data files.

CONCLUSION

Embodiments consistent with the subject matter of this disclosure resolve file synchronization metadata field conflicts between two versions of a file by examining and resolving the metadata conflicts separately from file content conflicts.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims. Further, the acts of the exemplary process described by FIGS. 3-4 may be performed in a different order in other embodiments. Other embodiments may include additional acts not described by FIGS. 3 and 4, and/or may not perform some of the acts described by FIGS. 3 and 4.

Accordingly, the appended claims and their legal equivalents define embodiments, rather than any specific examples given.

We claim as our invention:

1. A method for resolving conflicts via metadata examination, the method comprising:
   determining, by a computing device, whether a first copy of a file and a second copy of the file are different from each other, the first copy of the file and the second copy of the file each including respective content and respective metadata;
   determining, by the computing device, when the first copy of the file is determined to be different from the second copy of the file, whether all core metadata fields of the first copy of the file match corresponding core metadata fields of the second copy of the file;

performing, by the computing device when all of the core metadata fields of the first copy of the file are determined to match the corresponding core metadata fields of the second copy of the file:
  categorizing, by the computing device, a nature of differences of one or more metadata fields of the first copy of the file with respect to one or more corresponding metadata fields of the second copy of file, and
  resolving, by the computing device, a conflict of the one or more metadata fields of the first copy of the file with respect to the one or more corresponding metadata fields of the second copy of the file based on the categorized nature of the differences.

2. The method of claim 1, wherein the categorizing a nature of differences of one or more metadata fields of the first copy of the file with respect to one or more corresponding metadata fields of the second copy of the file comprises:
  categorizing the nature of differences of a metadata field of the one or more metadata fields of the first copy of the file with respect to a corresponding metadata field of the one or more metadata fields of the second copy of the file as mergeable or subsumable.

3. The method of claim 2, wherein when the nature of differences of the metadata field is categorized as mergeable, the method further comprises merging the metadata field of the first copy of the file with the corresponding metadata field of the second copy of the file to produce a conflict-resolved value for the metadata field of the first copy of the file and the corresponding metadata field of the second copy of the file.

4. The method of claim 2, wherein when the nature of differences of the metadata field is categorized as subsumable, the method further comprises replacing the metadata field of an older one of the first copy of the file and the second copy of the file with the metadata field of a younger one of the first copy of the file and the second copy of the file to produce a conflict-resolved value for the metadata field of the first copy of the file and the corresponding metadata field of the second copy of the file.

5. The method of claim 2, further comprising:
  determining, by the computing device, whether both of the first copy of the file and the second copy of the file have a missing value of a respective one of the one or more metadata fields that does not have a missing value in the respective corresponding metadata field of corresponding remaining ones of the first copy of the file and the second copy of the file;
  merging, when the both of the first copy of the file and the second copy of the file have the missing value of the respective one of the one or more metadata fields that is not missing in the respective corresponding metadata field of the respective remaining one of the first copy of the file and the second copy of the file, with the missing value of the respective one of the one or more metadata fields with a value of the corresponding one of the one or more metadata fields that is not missing to produce a conflict-resolved value for the metadata field previously having the missing value.

6. The method of claim 2, further comprising:
  determining, by the computing device, whether both of the first copy of the file and the second copy of the file have a missing value of a respective one of the one or more metadata fields that is not missing in the respective corresponding metadata field of a respective remaining one of the first copy of the file and the second copy of the file;
  declaring, when the determining fails to determine that the both of the first copy of the file and the second copy of the file are determined to have a missing value of a respective one of the one or more metadata fields that is not missing in the respective corresponding metadata field of a respective remaining one of the first copy of the file and the second copy of the file, one of the first file and the second file having fewer missing values of the one or more metadata fields as a winner and adding a value of the one or more metadata fields that are not missing to the corresponding one or more metadata fields that have a missing value.

7. The method of claim 1, wherein the determining whether a first copy of a file and a second copy of the file are different from each other further comprises:
  determining whether a first hash calculated over the first copy of the file is different from a second hash calculated over the second copy of the file.

8. The method of claim 1, further comprising:
  performing one of a number of actions when either all of the core metadata fields of the first copy of the file do not match all of the core metadata fields of the second copy of the file, or the first copy of the file is determined to be different from the second copy of the file after resolving metadata conflicts between the first copy of the file and the second copy of the file, the number of actions including: saving copies of both the first copy of the file and the second copy of the file; or prompting a user to specify how to resolve differences between the first copy of the file and the second copy of the file.

9. A machine-readable storage medium having instructions recorded therein for at least one processor of a computing device to perform a method, the method comprising:
  determining whether core metadata fields of a first copy of a file match core metadata fields of a second copy of the file;
  determining, when the core metadata fields of the first copy of the file and the second copy of the file are determined to match, whether a metadata field of the first copy of the file differs from a corresponding metadata field of the second copy of the file;
  categorizing a nature of a difference between the metadata field of the first copy of the file and the corresponding metadata field of the second copy of the file as either mergeable or subsumable when the metadata field of the first copy of the file is determined to differ from the corresponding metadata field of the second copy of the file;
  merging the metadata field of the first copy of the file with the corresponding metadata field of the second copy of the file to produce a conflict-resolved value for the metadata field of the first copy of the file and the corresponding metadata field of the second copy of the file when the nature of the difference is categorized as mergeable; and
  replacing the metadata field of an older one of the first copy of the file and the second copy of the file with the metadata field of a younger one of the first copy of the file and the second copy of the file to produce a conflict-resolved value for the metadata field of the older one of the first copy of the file and the second copy of the file when the nature of the difference is categorized as subsumable.

10. The machine-readable storage medium of claim 9, wherein the method further comprises:
  determining whether a metadata field of a first one of the first copy of the file and the second copy of the file is missing a value and a corresponding metadata field of a second one of the first copy of the file and the second copy of the file is not missing a value;

setting the metadata field of the first one of the first copy of the file and the second copy of the file to a value of the corresponding metadata field of the second one of the first copy of the file and the second copy of the file when the metadata field of the first one of the first copy of the file and the second copy of the file is missing the value and the corresponding metadata field of the second one of the first copy of the file and the second copy of the file is not missing the value.

11. The machine-readable storage medium of claim 9, further comprising:
after resolving differences between metadata fields of the first copy of the file and corresponding metadata fields of the second copy of the file, determining whether the first copy of the file is different from the second copy of the file; and
when the first copy of the file is determined to be different from the second copy of the file, saving copies of both of the first copy of the file and the second copy of the file.

12. The machine-readable storage medium of claim 9, further comprising:
after resolving differences between the metadata fields of the first copy of the file and corresponding metadata fields of the second copy of the file, determining whether the first copy of the file is different from the second copy of the file; and
performing one of a number of actions when the first copy of the file is determined to be different from the second copy of the file, the number of actions including: saving copies of both the first copy of the file and the second copy of the file; or prompting a user to specify how to resolve differences between the first copy of the file and the second copy of the file.

13. The machine-readable storage medium of claim 9, wherein the determining whether the first copy of the file is different from the second copy of the file further comprises:
comparing a first hash calculated over the first copy of the file with a second hash calculated over the second copy of the file.

14. A computing device comprising:
at least one processor; and
a memory connected with the at least one processor, the memory having instructions recorded therein, such that when the at least one processor executes the instructions the computing device performs a method including:
determining whether a first copy of a file differs from a second copy of the file; and
performing only when the first copy of the file is determined to differ from the second copy of the file:
determining whether all core metadata fields of the first copy of the file match corresponding core metadata fields of the second copy of the file, and
performing, only when all of the core metadata fields of the first copy of the file match the corresponding core metadata fields of the second copy of the file:
determining whether a non-core metadata field of the first copy of the file differs from a corresponding non-core metadata field of the second copy of the file,
determining whether a nature of a difference between the non-core metadata field of the first copy of the file and the corresponding non-core metadata field of the second copy of the file is either mergeable or subsumable,
merging the non-core metadata field of the first copy of the file with the corresponding non-core metadata field of the second copy of the file to produce a conflict-resolved value for the non-core metadata field of the first copy of the file and the corresponding non-core metadata field of the second copy of the file, when the nature of the difference is determined to be mergeable, and
replacing the non-core metadata field of an older one of the first copy of the file and the second copy of the file with the corresponding metadata field of a younger one of the first copy of the file and the second copy of the file to produce a conflict-resolved value for the non-core metadata field of an older one of the first copy of the file and the second copy of the file, when the nature of the difference is determined to be subsumable.

15. The computing device of claim 14, wherein the determining whether a first copy of a file differs from a second copy of the file comprises:
comparing a first hash calculated over the first copy of the file with a second hash calculated over the second copy of the file.

16. The computing device of claim 15, further comprising:
recalculating the first hash and the second hash after performing either of the merging or the replacing;
comparing the recalculated first hash with the recalculated second hash to determine whether the first copy of the file differs from the second copy of the file; and
resolving a difference between the first copy of the file and the second copy of the file when the comparing determines that the first copy of the file differs from the second copy of the file.

17. The computing device of claim 16, wherein the resolving a difference between the first copy of the file and the second copy of the file comprises:
performing one of a number of actions, the number of actions including: saving copies of the first copy of the file and the second copy of the file; and prompting a user to specify how to resolve differences between the first copy of the file and the second copy of the file.

18. The computing device of claim 16, wherein the resolving a difference between the first copy of the file and the second copy of the file comprises:
prompting a user to resolve the difference between the first copy of the file and the second copy of the file.

19. The computing device of claim 14, wherein the method further comprises:
determining whether the first copy of the file and the second copy of the file are each missing a respective value of one or more non-core metadata fields that are not missing in one or more corresponding non-core metadata fields of a respective other of the first copy of the file and the second copy of the file; and
when each of the first copy of the file and the second copy of the file are determined to be missing the respective value of the one or more non-core metadata fields that are not missing in the one or more corresponding non-core metadata fields of a respective other of the first copy of the file and the second copy of the file, performing:
merging a value of the one or more corresponding non-core metadata fields with each of the determined one or more non-core metadata fields to produce one or more conflict-resolved metadata fields for the first copy of the file and the second copy of the file.

20. The computing device of claim 14, wherein the method further comprises:
determining whether the first copy of the file and the second copy of the file are each missing a respective value of one or more non-core metadata fields that are not missing in one or more corresponding non-core metadata fields of a respective other of the first copy of the file and the second copy of the file; and when the determining fails to determine that the first copy of the file and the second copy of the file are each missing a respective value of one or more non-core metadata fields that are not missing in one or more corresponding non-core metadata fields of a respective other of the first copy of the file and the second copy of the file, performing:

declaring one of the first copy of the file and the second copy of the file having an extra non-core metadata field with a value as a winner, and adding one or more respective non-missing values of the non-core metadata fields of the winner to the one or more corresponding non-core metadata fields of a non-winner of the first copy of the file and the second copy of the file.

\* \* \* \* \*